United States Patent [19]
Thatcher et al.

[11] Patent Number: 6,061,743
[45] Date of Patent: May 9, 2000

[54] METHOD AND APPARATUS FOR AGGREGATING DISPARATE NAMESPACES

[75] Inventors: Jim Ernest Thatcher, Pleasant Grove; Thomas Edward Caldwell, Alpine, both of Utah

[73] Assignee: Novell, Inc., Orem, Utah

[21] Appl. No.: 09/025,741

[22] Filed: Feb. 19, 1998

[51] Int. Cl.⁷ ....................................................... G06F 17/30
[52] U.S. Cl. .......................... 709/302; 707/100; 707/104
[58] Field of Search ..................................... 709/201, 202, 709/203, 219, 225, 223, 300, 302, 303, 304, 305; 707/10, 100, 102, 103, 104, 101

[56] References Cited

U.S. PATENT DOCUMENTS

| | | | |
|---|---|---|---|
| 5,465,365 | 11/1995 | Winterbottom | 707/101 |
| 5,483,652 | 1/1996 | Sudama et al. | 707/10 |
| 5,689,701 | 11/1997 | Ault et al. | 707/10 |
| 5,832,506 | 11/1998 | Kuzma | 707/200 |
| 5,862,331 | 1/1999 | Herriot | 709/219 |

OTHER PUBLICATIONS

Extending the Windows Explorer with Name Space Extensions, David Campbell, (http://www.miccrosoft.com/win32dev/apiext/msjnames.htm) First published in Jul. 1996 issue of *Microsoft Systems Journal*.

Extending the Shell's Namespace, (http://www.microsoft.com/WIN32DEV/APIEXT/NAMEDOC.ZIP), 1997.

Java Naming Directory Interface SDK, Sun Microsystems, (http://www.javasoft.com/products/jndi/docs.html), 1997.

Novell CyberMall, ManageWise 2.1: Executive Summary. (http://www.novell.com/catalog/qr/sne54110.html), Jun. 1997.

*Primary Examiner*—Viet D. Vu
*Attorney, Agent, or Firm*—Dinsmore & Shohl LLP

[57] ABSTRACT

A computer system has a first namespace with a target, and interface module operative to read the first namespace. A second interface module is operative to read the second namespace. A registry comprises information that associates the first namespace with the first interface module, the second namespace with the second interface module, and the target with the second interface module. A generic user interface is capable of accessing the registry, and determining the associations therein. The user interface is further operative to display the first namespace based on information read by the first interface module, and upon the selection of the target, being operative to display at least a portion of the second namespace based on information read by the second interface module.

20 Claims, 5 Drawing Sheets

METHOD AND APPARATUS FOR AGGREGATING DISPARATE NAMESPACES

TECHNICAL FIELD

The present invention relates generally to managing computer resources, and will be specifically disclosed as a method and apparatus for aggregating disparate Namespaces.

BACKGROUND OF THE INVENTION

The virtual explosion of technological advances in microelectronics, digital computers, and software has changed the face of modern society. In fact, these technological advances have become so important and pervasive that some people refer to this explosion as the "Information Revolution." Through telephone lines, networks, satellite communications and the like, information is routinely generated, transmitted, received and processed.

Particularly in computer networks, but also in stand alone systems, a variety of different services are shared and accessed. Typically, each service has its own namespace which is generally incapable of integrating with the namespaces of other services. A namespace is a collection of names in a computing environment. Sometimes, each of the various names in a namespace are referred to as objects. For instance, a file system will have its own namespace with objects corresponding to the administer information and resources across the network has its own namespace with objects corresponding to the various identies in the management service. Likewise, namespaces can vary between two services that provide the same function. For instance, two different management services will typically have two different namespaces.

Due in part to the potentially broad range of services with disparate namespaces, it is desirable to have centralized user interface to interact with many different namespaces. Traditionally, to interact and view a namespace a user was required to implement a user interface designed specifically for the service associated with the namespace. For instance, if a user wanted to interact with the namespace for a database, the user had to run the user interface associated with that database. Likewise, if a user wanted to see the files and directories of a file system, the user had to run a user interface associated with the file system.

One attempt to provide a centralized user interface for disparate namespaces is the JAVA Naming and Directory Interface ("JNDI"). JNDI is an application programming interface ("API") that allows one namespace to know about another namespace. Using a mechanism in JNDI called a Federation, one can store a junction in a first namespace of how to reach an entry point into a second namespace. The problem with a Federation, however, is that both the namespaces are required to know intimately about each other. In other words, programmers are required to develop code such that each namespace can interact specifically within the other namespace. As one with ordinary skill in the art will readily appreciate, the requirements to establish a Federation is undesirable due to the need to develop the requisite intimate knowledge between the two namespaces.

Another attempt to integrate disparate namespaces is the WINDOWS 95 EXPLORER. The EXPLORER program is dedicated to viewing and modifying a file system. Additional namespaces can be displayed within EXPLORER through tailored dynamic link libraries ("DLL's"), with each DLL being associated with a particular file type. However, EXPLORER is dedicated to a file system namespace, and its extensions are likewise limited only to file types. As such, EXPLORER is ill suited for namespaces not associated with file systems.

Therefore, there is a need for a method and apparatus for aggregating disparate namespaces, independent of the type of namespaces, wherein each namespace does not require intimate knowledge of the other namespaces.

SUMMARY OF THE INVENTION

Accordingly, an object of one embodiment of the invention is to provide an improved method and apparatus to aggregate disparate namespaces.

Another object of one embodiment of the invention is to provide a generic user interface in which a variety of namespaces can be integrated and accessed independent of the types of the namespaces.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a computer system having a host namespace and a foreign namespace. An interface module is operative for accessing the foreign namespace. A generic user interface displays at least a portion of the first namespace and at least a portion of the second namespace based on information provided to the user interface from the interface module.

Another embodiment of the present invention is a method in the computer system. A first namespace having a plurality of objects is registered. A second namespace is also registered. At least a portion of the first namespace is displayed. A target object in the first namespace is selected. If the target object has an association with the second namespace, the second namespace is accessed and at least a portion of the second namespace is determined. At least a portion of the second namespace is displayed in relation to the target object.

Still another embodiment of the present invention is a computer system. A first namespace has a target, and a first interface module is operative to read the first namespace. A second interface module is operative to read a second namespace. A registry comprises information for associating the first namespace with the first interface module, the second namespace with the second interface module, and the target with the second interface module. A generic user interface separate from the first and second interface modules is capable of accessing the registry and determining the associations therein. The user interface is further operative to display the first namespace based on information read by the first interface module, and upon the selection of the target being operative to display at least a portion of the second namespace based on information read by the second interface module.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers communicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client machines tend to run client software and server machines tend to run server software, however a server can be a client as well.

Figure 1:
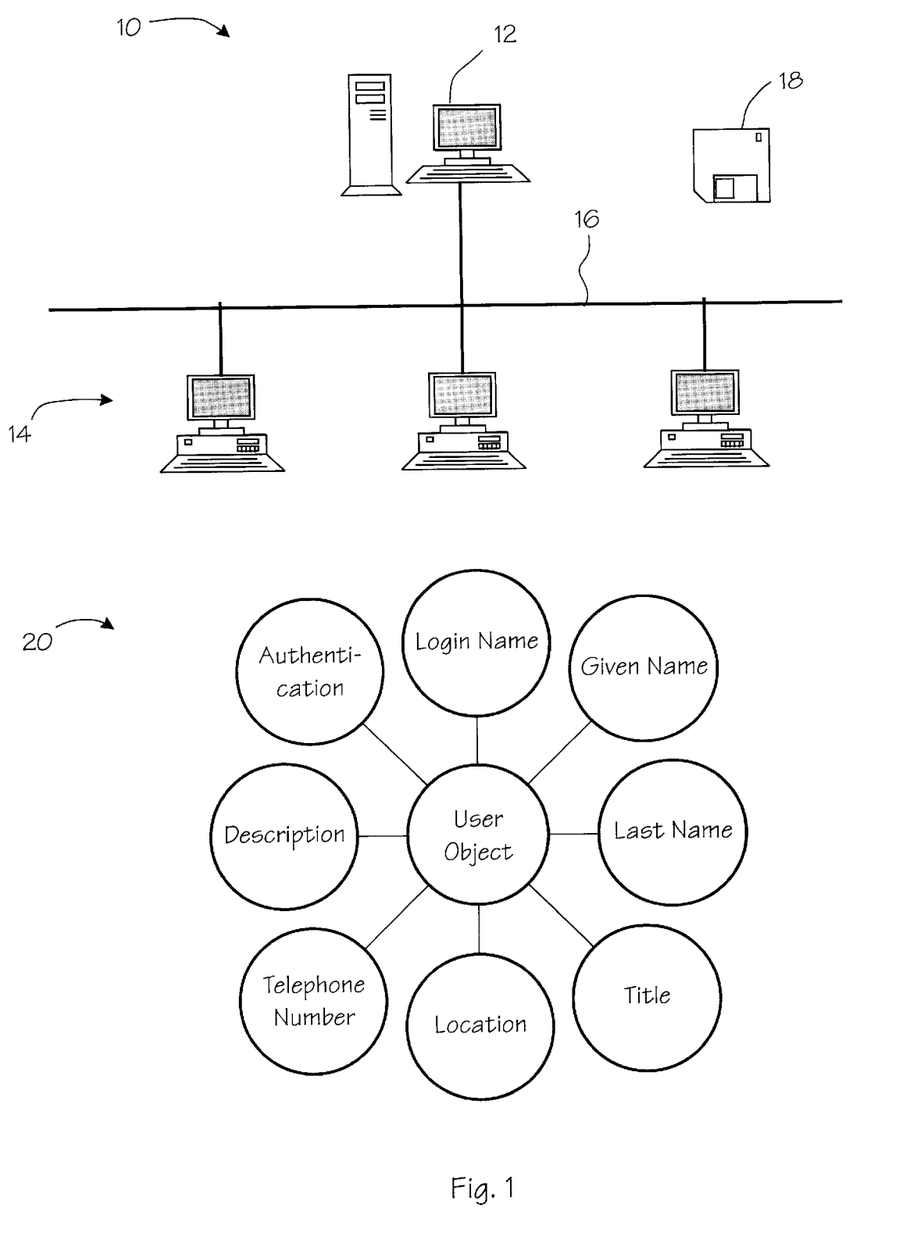
FIG. 1 depicts an example of interconnected nodes, a computer readable medium, and a management service object with several associated attributes.

FIG. 1 illustrates a sample client/server network 10. As one with ordinary skill in the art will readily appreciate, a client/server network is only one type of network, and a variety of other configurations, such as peer-to-peer connections, are also considered networks. In a client/server network, a plurality of nodes are interconnected such that the various nodes send and/or receive information to/from one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable medium, which are sometimes described as being nonvolatile, can retain data in the absence of power so that the information is available when power is restored.

A computer system typically has access to a variety of different namespaces. For instance, the file names and directory names of a file system constitute a namespace. As a further example, the names of the various entries in a database constitute a namespace. In still a further example, the list of services provided on a server in a computer network is considered its own namespace. As one with ordinary skill in the art will readily appreciate, a namespace can include any collection of names and is not limited by the specific examples provided herein.

For the purposes of illustration, some embodiments of the invention will be demonstrated in the context of a management service. When a group of computers are connected to one another, such as in a client/server network, a management service is typically used to organize, administer, and provide access to information and resources across the network. Management services usually access or include a collection of objects that represent a variety of things. For instance, some typical objects represent users, groups, printers, computers, and the like. In some management services, objects are organized in flat domains such as the SECURITY ACCOUNTS MANAGER ("SAM") of WINDOWS NT.

Another type of management service is organized as a synchronized hierarchal database called a distributed directory. One example of a distributed directory is the NOVELL DIRECTORY SERVICES ("NDS"), which is based on the X·500 network services protocol developed and published by the CCITT and Open Systems Interconnection Consortium. Another example of a distributed directory is ACTIVE DIRECTORY SERVICES ("ADS") by MICROSOFT. A distributed directory is an object database as opposed to the traditional relational model under Codd and Date. Usually in the context of a client/server network, a distributed directory spans and is shared by multiple networking server nodes, although a single server node can also maintain a distributed directory. While distributed directories are often used with client/server networks, they are not necessarily limited to the context of such networks. Information on the distributed directory can be created, read, modified, and shared by other nodes, such as client nodes or other server nodes, who have applicable access rights to the distributed directory.

A management service contains a collection of objects, sometimes referred to as identities, with associated attributes or properties. For example, the object 20 is a User object that represents a human user. Beyond representing users, objects represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

The object 20 has a variety of associated attributes, such as "Given Name", "Last Name", "Title", etc. Each associated attribute has zero or more values. For example, the value for the property "Given Name" might be "George". An attribute is usually based on an attribute syntax. The data which can be entered as a value associated with the attribute is dictated by the attribute syntax. For instance, NDS version 4.1 includes the following syntaxes: Back Link, Boolean, Case Exact String, Case Ignore List, Case Ignore String, Class Name, Counter, Distinguished Name, E-mail Address, Facsimile Telephone Number, Hold, Integer, Interval, Net Address, Numeric String, Object ACL, Octet List, Octet String, Path, Postal Address, Printable String, Replica Pointer, Stream, Telephone Number, Time, Timestamp, Typed Name, and Unknown.

Typically, the structure of the distributed directory is governed by a schema. The schema defines the rules for adding and managing objects and attributes of objects in the distributed directory. These rules are specified through a data dictionary that provides a standard set of data types or classes from which objects can be derived or instantiated. The definitions found in the data dictionary can themselves be represented as objects. Each object in the distributed directory belongs to an object class that specifies which attributes are associated with the object. Generally, the schema is extensible so that it may be tailored to modify existing classes or add new classes.

The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are the building blocks of the distributed directory. Objects that cannot contain other objects are known as non-container or leaf objects.

Figure 2:
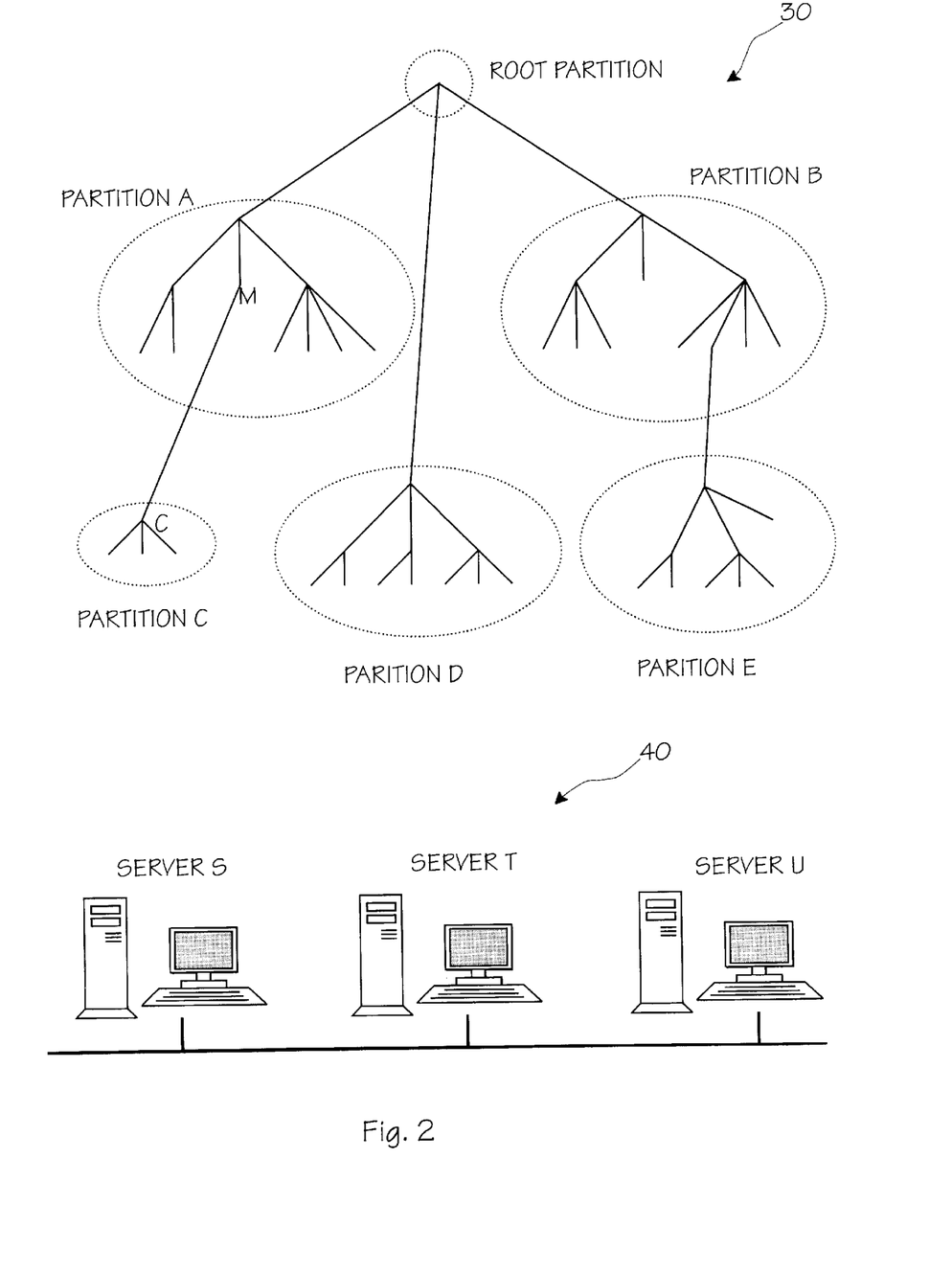
FIG. 2 depicts an example of a distributed directory and several servers accessing the distributed directory.

As shown in FIG. 2, the objects within the distributed directory 30 are often organized in a hierarchal structure, generally in the form of a tree, where the branching points and leaves represent the objects. In this hierarchy, objects closer to the root are superior or parents to objects further from the root, which are considered subordinate or children. For instance, the object M is the parent of the child object C. Object M can also be referred to as the container to object C. The distributed directory 30 is additionally organized in partitions, as illustrated by the dashed ellipses, with each partition comprising a plurality of objects organized as a logical sub-tree. Like objects, partitions closer to the root of the distributed directory 30 are called parent partitions to those further from the root, which are called child partitions. Each partition takes the name of the root object of the sub-tree. For instance, the root object of Partition C is the object C.

Multiple replicas of the partitions are stored across the network 40. Each replica of a partition holds the same set of objects with the same distinguished names ("DN"). The DN is a unique reference that identifies an object's distinct identity and location within a distributed directory. For instance, the DN ·CN=SteveM·OU=Denali·OU=Parks·O=NW·C=US isolates Steve M's User object to only one object in the entire distributed directory because it contains a unique path of container object names. Since a replica of a partition holds copies of the objects within the partitions, the copies of the objects are also considered replicas and do not constitute distinct objects. The relative distinguished name ("RDN") is the individual name assigned to an object, which must be unique only in relation to the object's superior object. In the above example, the RDN would be "SteveM".

Each insular server node can hold a unique set of partitions and therefore a unique set of objects within that insular node. For instance, the following table demonstrates a sample partition organization in NDS:

|  | ROOT | Partition A | Partition B | Partition C | Partition D | Partition E |
|---|---|---|---|---|---|---|
| Server S | Master | — | Master | Master | Read Only | Master |
| Server T | Read Only | Master | Secondary | — | Master | — |
| Server U | — | Read Only | Secondary | — | Read Only | Secondary |

As suggested by this table, there are three basic kinds of replicas in NDS. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition, called subordinate references, are also used to coordinate partitions between a plurality of nodes. A subordinate reference does not store a replica of its partition data. Rather, it is a skeleton: it stores only attributes to the partition's root most object. Whenever a server holds a complete replica (i.e. Master, Secondary or Read Only) of a partition, but not a directly subordinate partition, it keeps a subordinate reference of the subordinate partition. Referring to FIG. 2 and the above table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

The distributed directory is a loosely synchronized database. An update made at one replica does not appear instantaneously at the other replicas. As such, it is possible that when an attribute value has been updated recently, a client could get a different result when reading attributes from different servers. A replication system is used to replicate or synchronize different object changes to the other servers accessing the distributed directory. One way of achieving this replication or synchronization is using the partition as a unit of data replication. An update made at one replica propagates to other replicas over time. Once the update ceases, the replicas converge to identical values. The server keeps a time stamp for each value of each attribute of each entry, identifying when and where that value was last modified. Since there can be competing updates at different replicas, the time stamps are used to determine which update is later. Doing so ensures that whenever multiple servers receive competing updates, each server with get the same result.

When a change is made locally to an entry in the distributed directory, the change is detected and a process in the replication system on the server wakes up to propagate the change to all the replicas of the partition. Preferably, there is a brief time delay to allow a cluster of updates to be propagated in one session. This propagation proceeds one replica at a time through the replica list of a partition. After a server successfully sends all pending updates to one replica (or if the operation fails), it goes on to the next replica until all replicas have been updated. Replicas not updated in one round of the synchronization process are rescheduled for a later synchronization cycle. Also, obituaries keep track of information pending transmission to other servers. Obituaries are attribute values not visible to clients, but are used in server-server exchanges. Since obituaries are attribute values, they are synchronized using the same mechanism as the updates and are replicated across the distributed directory.

Figure 3:
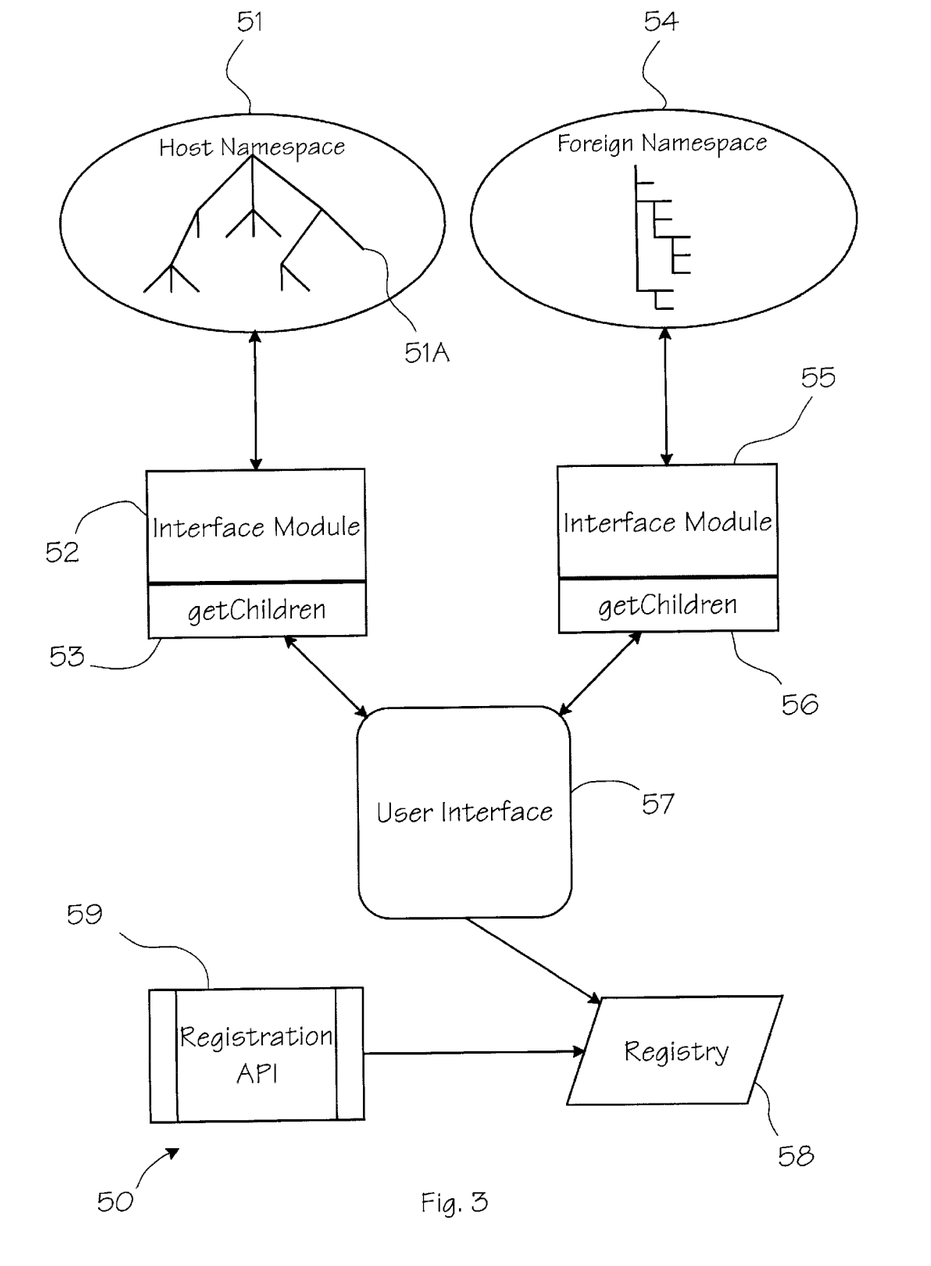
FIG. 3 depicts a schematic view of a computer system comprising two namespaces, a generic user interface, and a registry.

As shown in FIG. 3, the computer system 50 can comprise a single computer, a network of computers, a plurality of interconnected nodes, or any other configuration. The computer system 50 includes a host namespace 51 and a foreign namespace 54. Preferably, both namespaces are hierarchial having a plurality of objects, as represented in FIG. 3. However, one, neither or both of the namespaces 51, 54 can take a variety of different forms, such as a flat domain, a list, a single value, or the like.

The term "foreign" is used to connote that the foreign namespace 54 is different from the host namespace 51. For instance, the host namespace 51 could be NDS whereas the foreign namespace 54 could be a different management service, such as SAM or ADS. As further example, the host namespace 51 could be a file system and the foreign namespace 54 could be information about a specific type of file, such as the contents of a JAR file used in JAVA. In still another example, the host namespace 51 could be NDS and the foreign namespace 54 could be a file system. A foreign namespace 54 does not necessarily need to be of a different type of namespace from the host namespace 51. For instance, the host namespace 51 could be a first NDS directory and the foreign namespace 54 could be a second NDS directory. As one with ordinary skill in the art will readily appreciate, the host and foreign namespaces 51, 54 could be any two namespaces.

The interface modules 52, 55 comprise a plurality of instructions, preferably developed in the JAVA language, for accessing the respective namespaces 51, 54. For instance, the interface modules 52, 55 can be operative to read, write, modify, etc. their respective namespaces. Preferably, the interface modules 52, 55 are stand alone and separate modules, such as snap-in modules, designed specifically to access their respective namespaces 51, 54. However, the interface modules could also be incorporated within the respective namespaces. Appropriate access to a namespace typically requires intimate knowledge of that namespace. Therefore, it is preferred that the interface modules 52, 55 are developed by someone who has such intimate knowledge of the corresponding namespace 51, 54, such as the developer or provider of the namespace.

Each interface module 52, 55 includes one or more common external interfaces 53, 56, such as the getChildren API. Using an interface having a common set of parameters allows an external entity to send and receive information to and from the interface modules 52, 55 without requiring internal knowledge of the interfaces 52, 55. In one embodiment, a plurality of different external interfaces are built into each interface module, with each external interface having separate functionality. For instance, each of the several external interfaces could have separate functions such as reading the namespace, writing to the namespace, deleting information in the namespace, and the like. For the purposes of illustration, the invention will be demonstrated with the getChildren external interface, which returns a list of subordinate objects in the namespace for a specified object.

The user interface 57 acts as a hub for the computer system 50 and is preferably developed in the JAVA language. The user interface 57 provides a front end for users to view, read and modify a variety of disparate namespaces. The various objects in a namespace can be displayed, preferably in a hierarchal form, such as a tree. Using the user interface 57, a user will ideally be able to navigate through a variety of different namespaces, expanding or collapsing branches as needed. The user interface 57 is independent of any one namespace, and as such is generic. The term "generic" as a qualifier to the user interface 57 is intended to connote that the user interface 57 is independent of any one namespace. Preferably, each namespace 51, 54 is registered with the user interface 57. Registration is handled through the registration API 59, which can be a separate module or integrated into the user interface 57 or the interface modules 52, 55. The registration API 59 is responsible for creating the registry 58, which contains a variety of different values and associations. Preferably, the actual values and associations in the registry 58 are defined by the interface modules 52, 55. The registry 58 can be located in any computer readable medium, such as in RAM or in locally stored file on disk.

The registry 58 has a variety of different parts. Two such parts are the namespaces table and the extensions table. All namespaces which participate with the user interface 57 are registered in the namespace table. As such, any number of different namespaces can participate. Using the namespace table of the registry 58, the user interface 57 is able to associate the interface modules with the corresponding namespaces. Each namespace has a separate line in the namespace table associating that namespace with the corresponding interface module. One suitable format for the namespace table is listed below:

Value is: Namespace name, Namespace class file

The entry "Value is" is a run time instance or program variable of the corresponding namespace recognizable to the user interface 57. The entry "Namespace name" is the name of the namespace which is being registered. The entry "Namespace class file" provides an identifier to the corresponding interface module. For instance, if the interface modules are programmed in the JAVA language, the entry for "namespace class file" could be the JAVA path name of a class that implements that interface module.

The extensions table of the registry 58 creates an association between namespaces. For instance, the foreign namespace 54 can register itself to be associated with a target 51A of the host namespace 51. When the host namespace 51 is viewed in the user interface 57, the various objects in host namespace are displayed. An association can be created in the extension table between the target 51A and the foreign namespace 54. When the user requests to expand the target 51A, at least a portion of the foreign namespace 54 will be displayed in the user interface 57 relative to the target 51A. Preferably, the foreign namespace 54 will be displayed subordinate to the target 51A either as a subordinate branch or in an adjacent window, thus creating a seamless aggregation of the two namespaces 51, 54. Any number of extensions can be listed in the extension table of the registry 58. One suitable format for the extension table is listed below:

Value is: Namespace to extend, objectType to extend, extension class file

Preferably, the interface module 55 for the foreign namespace 54 defines the entries in the extension table corresponding to the foreign namespace 54. The entry "Value is" is a run time instance or program variable of the corresponding extension recognizable to the user interface 57. The entry "Namespace to extend" identifies the host namespace 51 to which the foreign namespace 54 extends. The entry "objectType to extend" provides an identifier of the target 51A in the host namespace 51 to which the foreign namespace 54 will extend. A variety of different identifiers can be implemented, however, it is preferred that the target 51A is identified by the target type. For instance, if the host namespace 51 is NDS and the foreign namespace 54 is a file system, the target 51A would be identified by its type (e.g. a volume object which in NDS represents a file system). The entry "extension class file" identifies the corresponding interface module 55 which implements the extension.

Consider the following example where the host namespace 51 is a file system and the foreign namespace 54 are the contents of PKZIP files. The host namespace 51 has no knowledge of the contents of a target PKZIP file 51A, but the foreign namespace 54 does. The user interface 57 allows a user to view a hierarchial representation of the host namespace 51, and upon the selection of the target PKZIP file 51A, seamlessly view the contents of the PKZIP file. The registry for this example could look like this:

Registered Namespaces
  Namespace.1: LocalFile, com.xyz.snapins.FileNamespace
  Namespace.2: ZipFile, com.xyz.snapins.ZipNamespace
Registered Extensions
  Extension.1: LocalFile, zip, com.xyz.snapins.ZipNamespace Both the local file namespace and the ZIP file namespace are registered in the namespace table of the registry 58, along with their corresponding interface modules. The extension table associates objects of type "zip" in the local file system with the snap-in having the JAVA class path name com.xyz.snapins.ZipNamespace to implement that snap-in. As such, ZIP files from the LocalFile namespace will be extended by ZipFile namespace. Note that the class file in the extension table is the same as the class file in the namespace table used to register ZipFile namespace. In this example, but not necessarily in all cases, this class file implements both the namespace and the extension interfaces.

Figure 4:
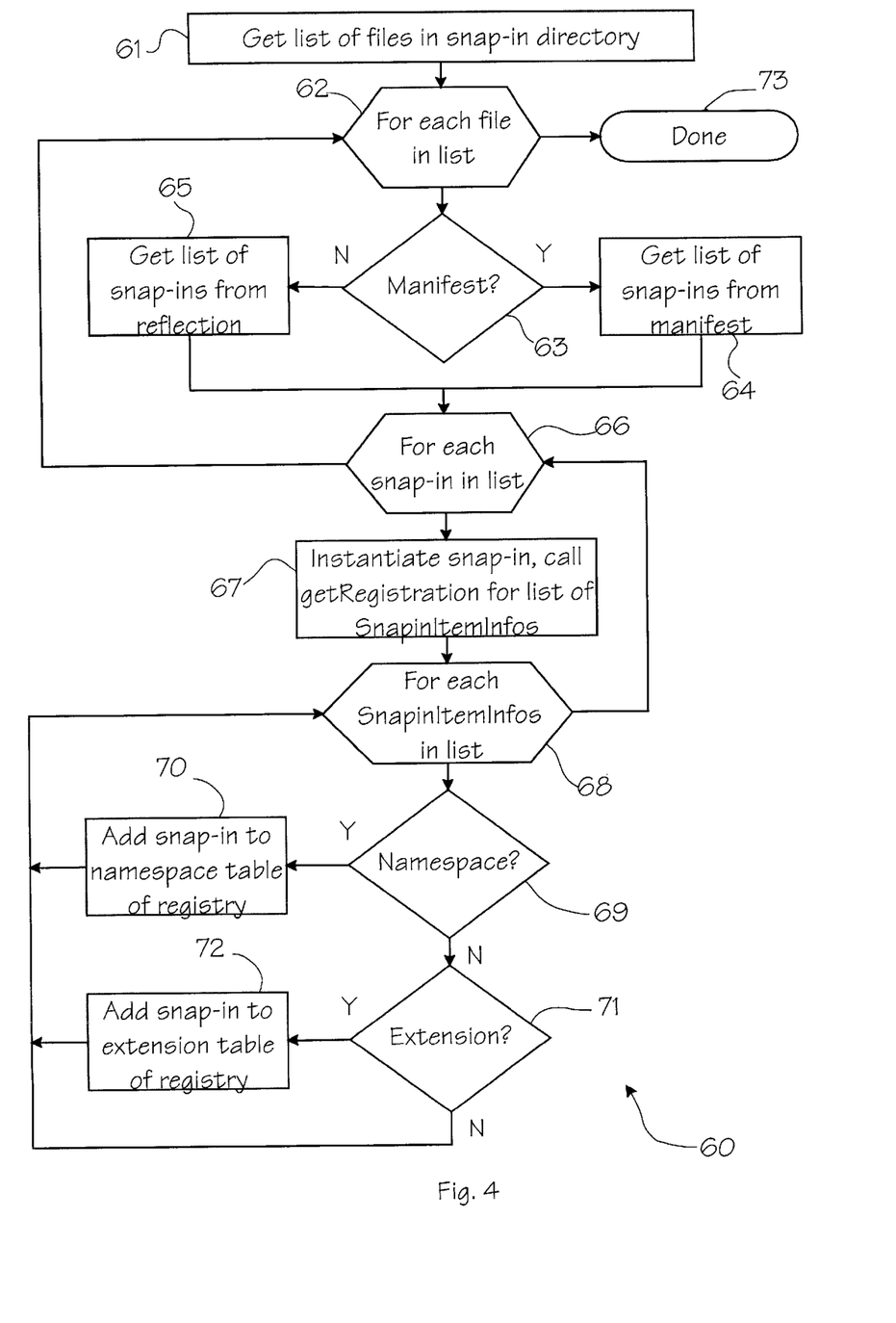
FIG. 4 depicts a flow chart of a method for generating a registry.

FIG. 4 illustrates a flow chart of a method for creating the registry 58. If the registry 58 is stored in volatile memory, it is preferred that this method 60 is implemented each time the user interface 57 is executed. Alternatively, if the registry 58 is stored in non-volatile memory, the method 60 can be run only once. At step 61, all files located in a pre-determined snap-in directory, preferably subordinate to the user interface 57 directory, are determined and a list is created. Preferably, the list only includes subdirectories, ZIP files or JAR files. At step 62, a loop is started to analyze each file in the list to determine whether it is a snap-in interface module participating in the computer system 50. At step 63, the method determines whether a manifest file exists for a given file. A manifest is a text file in a particular format describing information in another file. Preferably, standard manifest files for JAR or ZIP files is extended to identify whether a file is a snap-in or not. If a manifest exists, the method proceeds to step 64, where a list of snap-ins is read from the manifest. If a manifest does not exist, the method proceeds to step 65, where a list of snap-ins is determined from reflection. Specifically, every file in a ZIP, JAR or subdirectory is walked through to determine if it is a JAVA class file. If it is a JAVA class file, it is loaded and checked to see if it implements any of the snap-in interfaces of the user interface 57. If it does implement any such interfaces, it is added to the snap-in list.

At step 66, another loop is initiated to process each snap-in in the list. At step 67, the snap-in is instantiated and a call is made to the getRegistration function to determine the list of SnapInItemInfos. The SnapInItemInfos is a JAVA class containing registration information, including the snap-in type (e.g., namespace, extension, toolbar, etc.), the JAVA class name of the snap-in interface module, the host namespace and target type (if applicable). At step 68, still another loop is initiated to process each SnapInItemInfos in the list. In decision block 69, if a SnapInItemInfo registers a namespace, the method proceeds to step 70, where the snap-in is added to the namespace table of the registry 58. In decision block 71, if the SnapInItemInfo registers an extension, the method proceeds to step 72, where the snapin is added to the extension table of the registry 58. After each SnapInItemInfo for each snap-in is processed, and each snap-in for each file in the snap-in directory is processed, the method proceeds to step 73, where the registry 58 is completed.

The following pseudo-code describes one implementation of the registration process:

```
public class SnapinRegistry
{
    Vector namespaces = new Vector();
    Hashtable extensions = new Hashtable ();
    public void RegisterNamespace(Snapin snapin)
    {
        namespaces.addElement(snapin);
    }
    public Vector getNamespaces()
    {
        return namespaces;
    }
    public void RegisterExtension(String namespace, String objectType, Snapin extension)
    {
        String key = namespace + "&" objectType;
        Vector extensionList = null;
        if(extensions.containsKey(key))
        {
            extensionList = (Vector) extensions.get(key);
        }
        else
        {
            extensionList = new Vector();
            extensions.put(key, extensionList);
        }
        extensionListaddElement(extension);
    }
    public Vector getExtensions(String namespace, String objectType)
    {
        String key = namespace + "&" + objectType;
        if(extensions.containsKey(key))
        {
            return (Vector) extensions.get(key);
        }
        else
        {
            return (Vector) null;
        }
    }
}
```

Figure 5:
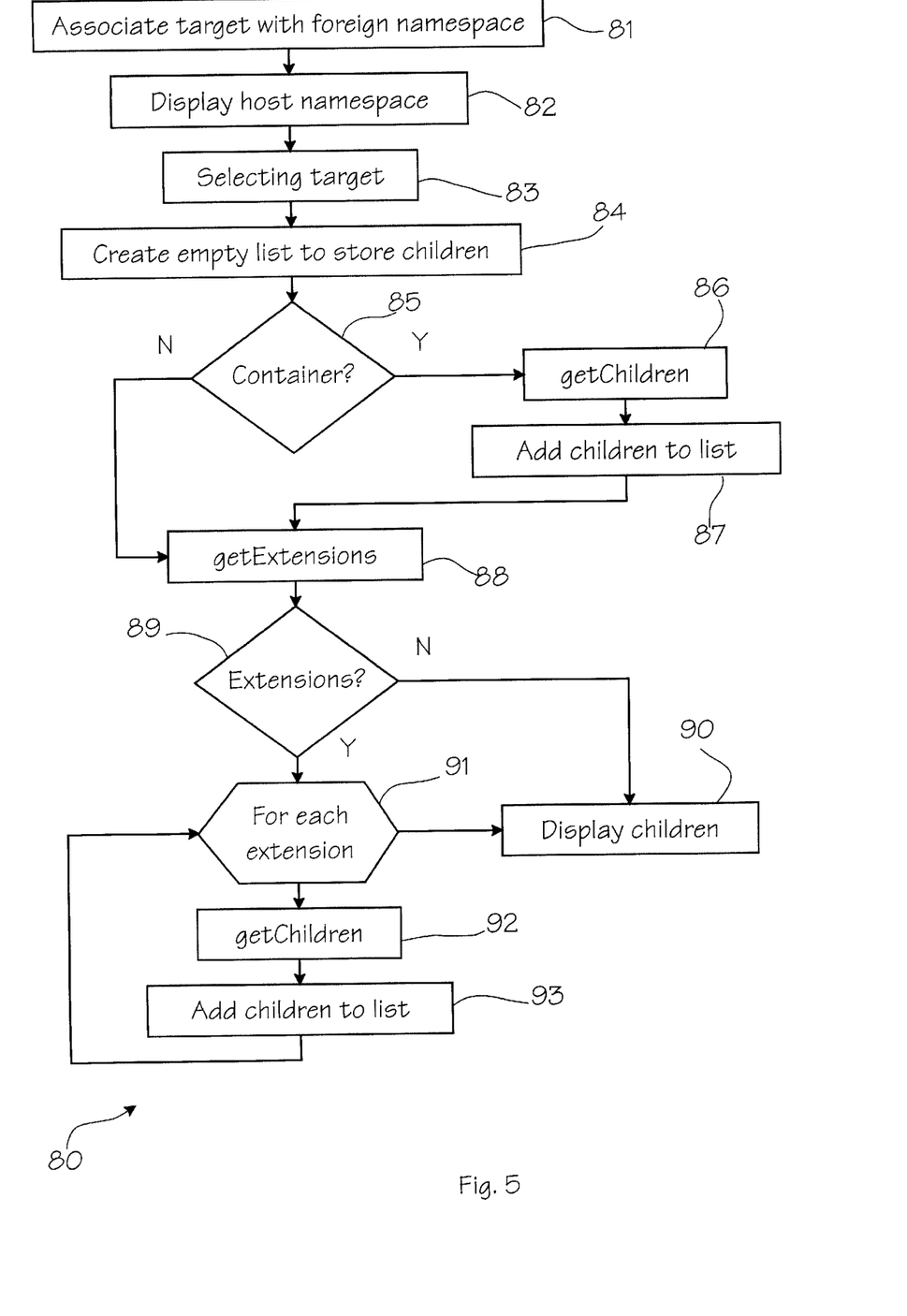
FIG. 5 depicts a flow chart of a method for aggregating disparate namespaces.

FIG. 5 illustrates a flow chart of a method 80. At step 81, the target 51A is associated with the foreign namespace 54. One way to achieve step 81 is by creating the extension table of the registry 58. In step 82, at least a portion of the host namespace 51 is displayed by the user interface 57. Preferably, assuming the host namespace 51 is hierarchial, the host namespace 51 is displayed in a tree fashion to represent the hierarchial nature of the host namespace 51. As the user traverses the tree, expanding and collapsing branches, the target 51A is eventually displayed in the user interface 57. In step 83, the target 51A is selected by mouse, keypad or other means, and preferably, is coupled with a request to expand the target 51A, such as a double click of a mouse. At step 84, an empty list is created to store any children subordinate to the target 51A.

In decision block 85, the method determines whether the target 51A is a container object within the host namespace 51 (i.e., whether the target 51A has subordinate objects within the host namespace 51). If so, the method 80 proceeds to step 86 where the user interface 57 issues a getChildren call to the interface module 52 specifying the target 51A. The interface module 52 accesses the host namespace 51 and determines whether any subordinate objects exist to the target 51A. Any subordinate objects which may exist are then returned to the user interface 57, and in step 87 those children are added to the list. Specifically, the getChildren API 53 returns JAVA objects representing the children. For each JAVA object, the getChildren API 53 returns the actual name of the instance of the JAVA object, an identifier to the namespace which it belongs (i.e. the host namespace 51), and the JAVA class from which it was instantiated.

After any children in the host namespace 51 are added to the list, the method proceeds to step 88 where a getExtensions call is made to read the registry 58. The extensions table of the registry 58 is searched for the target 51A. At decision block 89, it is determined whether any extensions are associated with the target 51A. If so, a loop is started at step 91 where for each extension listed in the registry 58, a getChildren call is made to a foreign namespace 54, and any corresponding children are added to the list in step 93. At step 90, all children in the list are then displayed by the user interface 57. Note that a target 51A can be both a container in the host namespace 51 and have extensions associated with it in a foreign namespace 54. The user interface 57 controls the actual display of the children. Preferably, the children are displayed relative to the target 51A, such as in a subordinate branch or in an adjacent window.

Preferably, an icon will be presented adjacent each child. The actual appearance of the icon is determined through a separate icon snap-in, which is registered and stored in an icon table in the registry 58, to associate the child type with a separate snap-in that specifies the icon's appearance. As such, the user interface 57 seamlessly merges the host namespace 51 with the foreign namespace 54 in the same display.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordinly, the invention is intended to embrace all such alternatives, modifications, and variations that fall within the spirit and broad scope of the impended claims.

What is claimed is:

1. A computer system, comprising:
   a) a host namespace;
   b) a foreign namespace,
   c) an interface module operative for accessing the foreign namespace; and
   d) a generic user interface displaying at least a portion of the host namespace and at least a portion of the foreign namespace based on information provided to the user interface from the interface module, said generic user interface being independent of the host and foreign namespaces.

2. A computer system as recited in claim 1, wherein the first namespace is a management service.

3. A computer system as recited in claim 1, wherein the interface module is specifically designed to read the second namespace.

4. A computer system as recited in claim 1, further comprising a registry accessible to the user interface, the registry having an association between the interface module with the foreign namespace.

5. A computer system as recited in claim 1, further comprising a host interface module operative for reading the host namespace.

6. A computer system as recited in claim 5, wherein the displayed portion of the host namespace is provided to the user interface from the host interface module.

7. A computer system as recited in claim 1, wherein the interface module is further operative to write to the foreign namespace.

8. A method in a computer system, comprising the steps of:
   a) registering a first namespace having a plurality of objects;
   b) registering a second namespace;
   c) displaying on a generic user interface at least a portion of the first namespace, the generic user interface being independent of the first and second namespaces;
   d) selecting a target object in the first namespace;
   e) if the target object has an association with the second namespace, accessing the second namespace and determining at least a portion of the second namespace; and
   f) displaying on the generic user interface at least a portion of the second namespace in relation to the target object.

9. A method as recited in claim 8, wherein the first namespace is displayed hierarchically and the second namespace is displayed subordinate to the target object within the hierarchy of the first namespace.

10. A method as recited in claim 8, further comprising the step of: if the target object has subordinate objects, reading the first namespace and determining at least a portion of the subordinate objects.

11. A method as recited in claim 10, further comprising the step of: displaying the subordinate objects in relation to the target object.

12. A computer readable medium comprising instructions capable of performing the method of claim 8.

13. A computer system, comprising:
   a) a first namespace having a target;
   b) a first interface module operative to read the first namespace;
   c) a second namespace;
   d) a second interface module operative to read the second namespace;
   e) a registry comprising information associating:
      (i) the first namespace with the first interface module,
      (ii) the second namespace with the second interface module,
      (iii) the target with the second interface module; and
   f) a generic user interface separate from the first and second interface modules, said user interface being capable of accessing the registry and determining the associations therein, and being operative to display the first namespace based on information read by the first interface module, and upon the selection of the target being operative to display at least a portion of the second namespace based on information read by the second interface module.

14. A computer system as recited in claim 13, wherein the first namespace is a distributed directory.

15. A computer system as recited in claim 13, wherein the first and second interface modules are further operative to modify the first and second namespaces, respectively.

16. A computer system as recited in claim 13, wherein the registry comprises a namespace registration portion and an extension registration portion.

17. A computer system as recited in claim 13, wherein registry associates the target and the second interface module based on the target's type.

18. A computer system as recited in claim 13, wherein registry associates the target and second interface module by identifying the class that implements the second interface module.

19. A method for using the computer system of step 13, comprising the steps of:

a) determining from the registry the association between the first interface module and the first namespace;

b) reading the first namespace by the first interface module;

c) displaying in the user interface the target in relation to at least a portion of the first namespace based on the information read from the first namespace;

d) requesting to expand the target;

e) determining from the registry the association between the second interface module and the target;

f) reading the second namespace by the second interface module; and g) displaying in the user interface at least a portion of the information read from the second namespace in relation to the target.

20. A computer system as recited in claim 13, further comprising interface modules operative to modify the first and second namespaces.

* * * * *